（12）United States Patent
Kearney et al.

(10) Patent No.: US 12,503,279 B2
(45) Date of Patent: Dec. 23, 2025

(54) DRINKS CONTAINER

(71) Applicant: AWL IN IP PTY LTD., Rochedale South (AU)

(72) Inventors: Michael Kearney, Parkinson (AU); Alexander Wall, West End (AU); Reid Price, West End (AU)

(73) Assignee: AWL IN IP PTY LTD, Rochedale South (AU)

( * ) Notice: Subject to any disclaimer, the term of this patent is extended or adjusted under 35 U.S.C. 154(b) by 114 days.

(21) Appl. No.: 18/257,239

(22) PCT Filed: Dec. 14, 2021

(86) PCT No.: PCT/AU2021/051490
§ 371 (c)(1),
(2) Date: Jun. 13, 2023

(87) PCT Pub. No.: WO2022/126182
PCT Pub. Date: Jun. 23, 2022

(65) Prior Publication Data
US 2025/0074667 A1    Mar. 6, 2025

(30) Foreign Application Priority Data

Dec. 14, 2020 (AU) ............................. 2020904654
Aug. 25, 2021 (AU) ............................. 2021107447

(51) Int. Cl.
*A45F 3/18* (2006.01)
*B65D 21/02* (2006.01)
(Continued)

(52) U.S. Cl.
CPC ............. *B65D 47/061* (2013.01); *A45F 3/18* (2013.01); *B65D 21/0209* (2013.01); *B65D 47/12* (2013.01); *B65D 2547/066* (2013.01)

(58) Field of Classification Search
CPC .... A45F 3/18; A45F 3/16; B65D 1/02; B65D 1/0207; B65D 1/0223; B65D 1/0246;
(Continued)

(56) References Cited

U.S. PATENT DOCUMENTS

| 2,649,226 A * | 8/1953 | Lay ...................... B65D 47/061 |
| | | 222/542 |
| 2,649,227 A * | 8/1953 | Vaughn ................ B65D 47/061 |
| | | 222/539 |

(Continued)

FOREIGN PATENT DOCUMENTS

| CN | 110613289 | 12/2019 | |
| KR | 101785906 B1 * | 10/2017 | ............. B65D 51/18 |

(Continued)

OTHER PUBLICATIONS

International Search Report from corresponding PCT Appln. No. PCT/AU2021/051490, dated Mar. 21, 2022.
(Continued)

*Primary Examiner* — Anthony D Stashick
*Assistant Examiner* — Marcos Javier Rodriguez Molina
(74) *Attorney, Agent, or Firm* — Grossman, Tucker, Perreault & Pfleger, PLLC

(57) ABSTRACT

A drinks container comprising a container body having a side wall terminating in a rim and defining an open top. The container includes an adapter mounted on the container body which is interchangeable between a first configuration having a centrally positioned primary outlet for a user to drink therefrom and a second inverted configuration forming a secondary outlet adjacent to the side wall. The secondary outlet can be opened allowing a drink to flow to the rim of the container where it can be drunk. The rim of the container may be sloped and have a pinnacle that extends proud of the remainder of the rim.

20 Claims, 13 Drawing Sheets

(51) Int. Cl.
*B65D 47/06* (2006.01)
*B65D 47/12* (2006.01)
*A45F 3/16* (2006.01)
*A47G 19/22* (2006.01)
*B65D 1/26* (2006.01)
*B65D 25/50* (2006.01)
*B65D 43/02* (2006.01)

(58) Field of Classification Search
CPC ...... B65D 1/0276; B65D 1/0284; B65D 1/04; B65D 1/06; B65D 1/22; B65D 1/225; B65D 1/24; B65D 1/246; B65D 1/26; B65D 1/265; B65D 1/30; B65D 1/32; B65D 1/34; B65D 1/36; B65D 1/40; B65D 1/42; B65D 11/04; B65D 11/06; B65D 11/08; B65D 11/10; B65D 11/1853; B65D 11/26; B65D 15/02; B65D 15/08; B65D 17/4012; B65D 17/4014; B65D 17/502; B65D 17/506; B65D 19/06; B65D 19/18; B65D 21/00; B65D 21/02; B65D 21/0202; B65D 21/0204; B65D 21/0206; B65D 21/0209; B65D 21/0212; B65D 21/0217; B65D 21/0219; B65D 21/022; B65D 21/0222; B65D 21/0223; B65D 21/023; B65D 21/0231; B65D 21/0233; B65D 21/0234; B65D 21/08; B65D 21/086; B65D 2201/00; B65D 2203/00; B65D 2203/02; B65D 2203/04; B65D 2203/06; B65D 2203/10; B65D 2203/12; B65D 2205/00; B65D 2205/02; B65D 2207/00; B65D 2215/02; B65D 2215/04; B65D 2231/022; B65D 2251/0015; B65D 2251/0018; B65D 2251/0021; B65D 2251/0025; B65D 2251/0078; B65D 2251/0087; B65D 2251/0093; B65D 2251/02; B65D 2251/023; B65D 2251/04; B65D 2251/08; B65D 2251/09; B65D 2251/1008; B65D 2251/1016; B65D 2251/1025; B65D 2251/105; B65D 2251/1058; B65D 2251/1066; B65D 2251/1083; B65D 2251/1091; B65D 2251/205; B65D 2255/20; B65D 23/00; B65D 23/003; B65D 23/02; B65D 23/08; B65D 23/0821; B65D 23/0828; B65D 23/0885; B65D 23/10; B65D 23/104; B65D 23/106; B65D 23/12; B65D 2313/02; B65D 2313/04; B65D 2401/10; B65D 2401/15; B65D 2401/25; B65D 2401/55; B65D 2401/60; B65D 25/00; B65D 25/02; B65D 25/04; B65D 25/08; B65D 25/10; B65D 25/102; B65D 25/106; B65D 25/108; B65D 25/16; B65D 25/18; B65D 25/205; B65D 25/22; B65D 25/24; B65D 25/28; B65D 25/2808; B65D 25/2811; B65D 25/282; B65D 25/2841; B65D 25/2867; B65D 25/2885; B65D 25/32; B65D 25/46; B65D 25/50; B65D 25/54; B65D 2501/0081; B65D 2501/24859; B65D 2517/0014; B65D 2517/0022; B65D 2517/0034; B65D 2517/0044; B65D 2517/0046; B65D 2517/0061; B65D 2517/0094; B65D 2517/5035; B65D 2517/5083; B65D 2519/00174; B65D 2519/00338; B65D 2519/00502; B65D 2519/00527; B65D 2519/00592; B65D 2519/00641; B65D 2519/00661; B65D 2519/00711; B65D 2519/0081; B65D 2519/0091; B65D 2519/00975; B65D 2519/00995; B65D 2525/283; B65D 2539/001; B65D 2539/003; B65D 2543/00027; B65D 2543/00046; B65D 2543/00064; B65D 2543/00083; B65D 2543/00092; B65D 2543/00101; B65D 2543/00148; B65D 2543/00166; B65D 2543/00175; B65D 2543/00194; B65D 2543/00203; B65D 2543/0025; B65D 2543/00268; B65D 2543/00277; B65D 2543/00296; B65D 2543/00314; B65D 2543/00351; B65D 2543/00361; B65D 2543/0037; B65D 2543/00379; B65D 2543/00407; B65D 2543/00416; B65D 2543/00425; B65D 2543/00435; B65D 2543/00453; B65D 2543/00472; B65D 2543/00481; B65D 2543/0049; B65D 2543/005; B65D 2543/00509; B65D 2543/00518; B65D 2543/00527; B65D 2543/00537; B65D 2543/00546; B65D 2543/00555; B65D 2543/00564; B65D 2543/00574; B65D 2543/0062; B65D 2543/00629; B65D 2543/00638; B65D 2543/00648; B65D 2543/00657; B65D 2543/00666; B65D 2543/00685; B65D 2543/00694; B65D 2543/00731; B65D 2543/0074; B65D 2543/00759; B65D 2543/00768; B65D 2543/00796; B65D 2543/00805; B65D 2543/00824; B65D 2543/00833; B65D 2543/00842; B65D 2543/00851; B65D 2543/00888; B65D 2543/00907; B65D 2543/00972; B65D 2547/063; B65D 2547/066; B65D 2571/00055; B65D 2571/00061; B65D 2571/00111; B65D 2575/583; B65D 2577/042; B65D 2577/043; B65D 2577/048; B65D 2581/3462; B65D 2583/005; B65D 2583/0409; B65D 2583/0495; B65D 2585/366; B65D 2585/56; B65D 2585/6882; B65D 2588/125; B65D 29/04; B65D 3/10; B65D 31/00; B65D 31/10; B65D 31/12; B65D 31/14; B65D 31/18; B65D 33/00; B65D 33/001; B65D 33/004; B65D 33/01; B65D 33/02; B65D 33/06; B65D 33/08; B65D 33/16; B65D 33/1658; B65D 33/1675; B65D 33/20; B65D 33/25; B65D 33/2508; B65D 33/2541; B65D 33/2566; B65D 33/30; B65D 35/08; B65D 35/242; B65D 35/285; B65D 35/36; B65D 35/44; B65D 39/00; B65D 39/0017; B65D 39/0023; B65D 39/0064; B65D 39/04; B65D 39/06; B65D 39/08; B65D 39/082; B65D 39/086; B65D 39/12; B65D 39/16; B65D 41/00; B65D 41/04; B65D 41/0407; B65D 41/0414; B65D 41/0428; B65D 41/0435; B65D 41/045; B65D 41/0471; B65D 41/0485; B65D 41/0492; B65D 41/06; B65D 41/065; B65D 41/08; B65D 41/16; B65D 41/165; B65D 41/17; B65D 41/26; B65D 41/28; B65D 41/32; B65D 41/3423; B65D 41/3428; B65D 41/3447;
B65D 41/3457; B65D 41/44; B65D
41/58; B65D 41/62; B65D 43/02; B65D
43/0202; B65D 43/0204; B65D 43/0208;
B65D 43/021; B65D 43/0212; B65D
43/0218; B65D 43/022; B65D 43/0222;
B65D 43/0225; B65D 43/0231; B65D
43/0237; B65D 43/0252; B65D 43/0254;
B65D 43/0256; B65D 43/06; B65D
43/12; B65D 43/16; B65D 43/161; B65D
43/162; B65D 43/163; B65D 43/164;
B65D 43/166; B65D 43/168; B65D
43/169; B65D 43/18; B65D 43/22; B65D
43/24; B65D 43/26; B65D 45/00; B65D
45/16; B65D 45/20; B65D 45/22; B65D
45/24; B65D 45/28; B65D 45/32; B65D
45/322; B65D 45/325; B65D 45/34;
B65D 47/02; B65D 47/04; B65D 47/043;
B65D 47/06; B65D 47/061; B65D
47/066; B65D 47/068; B65D 47/08;
B65D 47/0804; B65D 47/0809; B65D
47/0814; B65D 47/0828; B65D 47/0838;
B65D 47/0847; B65D 47/0852; B65D
47/0871; B65D 47/0885; B65D 47/0895;
B65D 47/12; B65D 47/122; B65D
47/123; B65D 47/125; B65D 47/126;
B65D 47/185; B65D 47/20; B65D
47/2006; B65D 47/2018; B65D 47/2031;
B65D 47/2037; B65D 47/2062; B65D
47/24; B65D 47/242; B65D 47/243;
B65D 47/247; B65D 47/261; B65D
47/265; B65D 47/268; B65D 47/32;
B65D 47/42; B65D 49/02; B65D 49/04;
B65D 49/08; B65D 49/12; B65D 5/32;
B65D 5/322; B65D 5/323; B65D 5/325;
B65D 5/36; B65D 5/42; B65D 5/4245;
B65D 5/4295; B65D 5/44; B65D
5/46016; B65D 5/4604; B65D 5/4608;
B65D 5/46112; B65D 5/48; B65D
5/48038; B65D 5/50; B65D 5/5004;
B65D 5/5021; B65D 5/503; B65D
5/5035; B65D 5/5038; B65D 5/504;
B65D 5/52; B65D 5/54; B65D 5/543;
B65D 5/643; B65D 5/66; B65D 5/6611;
B65D 5/6626; B65D 5/6667; B65D 5/68;
B65D 5/72; B65D 50/04; B65D 50/041;
B65D 50/043; B65D 50/046; B65D
50/06; B65D 50/061; B65D 50/066;
B65D 50/067; B65D 51/00; B65D 51/02;
B65D 51/04; B65D 51/145; B65D 51/16;
B65D 51/1616; B65D 51/1627; B65D
51/1633; B65D 51/1644; B65D 51/18;
B65D 51/20; B65D 51/223; B65D
51/226; B65D 51/24; B65D 51/241;
B65D 51/242; B65D 51/245; B65D
51/246; B65D 51/249; B65D 51/26;
B65D 51/28; B65D 51/2807; B65D
51/2821; B65D 51/2842; B65D 51/285;
B65D 51/2864; B65D 51/2892; B65D
51/30; B65D 51/32; B65D 53/02; B65D
53/06; B65D 55/00; B65D 55/02; B65D
55/022; B65D 55/024; B65D 55/026;
B65D 55/06; B65D 55/063; B65D
55/066; B65D 55/0836; B65D 55/0863;
B65D 55/10; B65D 55/145; B65D 55/16;
B65D 65/40; B65D 65/466; B65D 67/00;
B65D 7/34; B65D 71/00; B65D 71/0096;
B65D 75/008; B65D 75/305; B65D
75/327; B65D 75/34; B65D 75/44; B65D
75/566; B65D 75/5827; B65D 75/5855;
B65D 75/5866; B65D 75/5883; B65D
77/003; B65D 77/04; B65D 77/0453;
B65D 77/046; B65D 77/06; B65D
77/065; B65D 77/067; B65D 77/12;
B65D 77/20; B65D 77/2016; B65D
77/2056; B65D 77/2088; B65D 77/26;
B65D 81/18; B65D 81/20; B65D 81/24;
B65D 81/245; B65D 81/263; B65D
81/265; B65D 81/266; B65D 81/32;
B65D 81/3205; B65D 81/3211; B65D
81/3216; B65D 81/325; B65D 81/3266;
B65D 81/3272; B65D 81/3283; B65D
81/3288; B65D 81/3453; B65D 81/3484;
B65D 81/36; B65D 81/361; B65D
81/365; B65D 81/3802; B65D 81/3806;
B65D 81/3811; B65D 81/3813; B65D
81/3818; B65D 81/3821; B65D 81/3823;
B65D 81/3825; B65D 81/3834; B65D
81/3848; B65D 81/3876; B65D 81/3879;
B65D 81/3888; B65D 81/3897; B65D
83/00; B65D 83/04; B65D 83/049; B65D
83/06; B65D 83/0805; B65D 83/16;
B65D 83/20; B65D 83/44; B65D 83/48;
B65D 83/7532; B65D 83/7535; B65D
83/761; B65D 83/771; B65D 85/07;
B65D 85/08; B65D 85/109; B65D 85/12;
B65D 85/32; B65D 85/34; B65D 85/345;
B65D 85/36; B65D 85/38; B65D 85/50;
B65D 85/58; B65D 85/60; B65D 85/68;
B65D 85/70; B65D 85/72; B65D 85/76;
B65D 85/8055; B65D 85/808; B65D
85/84; B65D 88/126; B65D 88/1668;
B65D 88/28; B65D 88/32; B65D 9/04;
B65D 90/545; B65D 90/582; B65D
90/623; B65D 90/626; B65D 90/66;
A47G 19/2266

USPC ........ 206/0.5, 0.6, 0.7, 0.81, 0.82, 0.83, 1.5,
206/1.7, 1.8, 100, 102, 103, 105, 107,
206/112, 118, 120, 122, 139, 141, 144,
206/145, 15.2, 15.3, 153, 155, 158, 160,
206/167, 172, 173, 180, 19, 191, 193,
206/199, 204, 205, 207, 209, 209.1, 210,
206/212, 213.1, 214, 215, 216, 217, 218,
206/219, 221, 222, 223, 224, 226, 227,
206/228, 229, 232, 233, 235, 236, 242,
206/244, 245, 246, 247, 250, 253, 254,
206/256, 259, 260, 264, 265, 266, 267,
206/268, 269, 270, 271, 273, 274, 277,
206/278, 279, 281, 284, 289, 291, 292,
206/296, 297, 298, 299, 3, 301, 303, 304,
206/305, 306, 307, 307.1, 308.1, 308.2,
206/308.3, 309, 310, 311, 312, 314,
206/315.1, 315.11, 315.2, 315.3, 315.4,
206/315.6, 315.9, 316.1, 317, 319, 320,
206/321, 323, 326, 327, 335, 337, 338,
206/339, 340, 349, 351, 352, 358, 361,
206/362, 362.2, 362.4, 363, 364, 365,
206/366, 367, 368, 369, 37, 370, 371,
206/372, 373, 379, 38, 38.1, 380, 381,
206/382, 383, 385, 386, 387.1, 387.11,

206/387.12, 387.13, 388, 389, 39, 39.8,
206/390, 391, 393, 394, 395, 397, 398,
206/403, 404, 405, 406, 407, 408, 409,
206/414, 416, 418, 419, 422, 423, 424,
206/425, 427, 428, 429, 431, 433, 434,
206/438, 439, 440, 441, 443, 445, 446,
206/449, 45.2, 45.21, 45.22, 45.23, 45.24,
206/45.25, 45.26, 45.28, 45.29, 45.3, 450,
206/451, 454, 455, 456, 457, 459.1,
206/459.5, 460, 461, 462, 463, 464, 465,
206/467, 468, 469, 470, 471, 472, 473,
206/474, 475, 477, 478, 484, 484.2, 485,
206/486, 489, 490, 493, 494, 495, 496,
206/497, 499, 5, 5.1, 500, 501, 503, 504,
206/505, 506, 507, 508, 509, 510, 511,
206/514, 515, 516, 518, 519, 520, 521,
206/521.1, 521.15, 521.3, 521.4, 521.6,
206/521.7, 521.8, 521.9, 522, 523, 524.1,
206/524.2, 524.3, 524.4, 524.6, 524.7,
206/524.8, 525, 526, 527, 528, 530, 531,
206/532, 533, 534, 534.1, 535, 536, 538,
206/539, 540, 541, 542, 545, 546, 549,
206/551, 553, 555, 556, 557, 558, 560,
206/561, 562, 563, 564, 565, 566, 568,
206/569, 570, 571, 572, 574, 575, 576,
206/577, 579, 581, 583, 584, 586, 587,
206/589, 590, 591, 592, 593, 594, 596,
206/597, 598, 599, 6, 6.1, 600, 63.3,
206/63.5, 701, 702, 703, 704, 705, 706,
206/707, 708, 710, 711, 718, 719, 721,
206/723, 725, 726, 730, 733, 734, 735,
206/736, 738, 739, 741, 742, 743, 746,
206/747, 748, 752, 753, 754, 755, 756,
206/758, 759, 760, 761, 762, 763, 765,
206/766, 768, 769, 77.1, 771, 772, 774,
206/775, 776, 777, 779, 781, 782, 784, 8,
206/800, 804, 806, 807, 81, 810, 811,
206/812, 813, 814, 815, 816, 817, 818,
206/819, 820, 821, 822, 823, 828, 83,
206/83.5, 830, 831, 832, 88, 92, 93, 94,
206/95; 215/10, 11.1, 11.2, 11.3, 11.4,
215/11.5, 11.6, 12.1, 12.2, 13.1, 14, 16,
215/17, 18, 19, 2, 20, 200, 201, 202, 203,
215/204, 206, 207, 208, 209, 21, 211,
215/212, 213, 214, 215, 216, 217, 218,
215/219, 22, 220, 221, 222, 223, 224,
215/225, 226, 227, 228, 229, 23, 230,
215/231, 232, 233, 235, 236, 237, 238,
215/239, 240, 241, 242, 243, 244, 245,
215/246, 247, 249, 25, 250, 251, 252,
215/253, 254, 255, 256, 257, 258, 26,
215/260, 261, 262, 263, 267, 270, 271,
215/272, 273, 274, 275, 276, 277, 278,
215/279, 28, 280, 281, 284, 285, 286,
215/287, 288, 289, 29, 290, 291, 292,
215/293, 294, 295, 296, 297, 298, 299,
215/30, 301, 302, 303, 304, 305, 306,
215/307, 308, 309, 310, 311, 312, 313,
215/314, 315, 316, 317, 318, 319, 320,
215/321, 322, 324, 325, 326, 327, 328,
215/329, 330, 331, 332, 334, 335, 336,
215/337, 338, 339, 340, 341, 342, 343,
215/344, 345, 346, 347, 348, 349, 350,
215/351, 352, 353, 354, 355, 356, 358,
215/359, 360, 361, 363, 364, 365, 366,
215/370, 371, 373, 374, 376, 377, 379,
215/382, 383, 384, 386, 387, 388, 389,
215/390, 391, 395, 396, 398, 399, 40,
215/400, 41, 42, 43, 44, 45, 46, 47, 48, 5,
215/52, 6, 900, 901, 902, DIG. 1, DIG. 3,
215/DIG. 5, DIG. 7, DIG. 8; 220/1.5, 2.2,
220/2.3 R, 200, 201, 203.01, 203.04,
220/203.05, 203.07, 203.09, 203.11,
220/203.13, 203.17, 203.18, 203.19,
220/203.22, 203.24, 203.25, 203.26,
220/203.27, 203.29, 210, 211, 212, 212.5,
220/213, 214, 215, 228, 229, 23.2, 23.4,
220/23.6, 23.8, 23.83, 23.86, 23.87,
220/23.88, 23.89, 23.9, 23.91, 230, 231,
220/232, 233, 234, 235, 238, 240, 242,
220/243, 246, 251, 252, 253, 254.1,
220/254.2, 254.3, 254.4, 254.5, 254.7,
220/254.8, 254.9, 255, 255.1, 256.1,
220/257.1, 258.1, 258.2, 258.3, 258.4,
220/258.5, 259.1, 259.2, 259.3, 259.4,
220/259.5, 260, 262, 263, 264, 265, 266,
220/267, 268, 269, 270, 271, 274, 276,
220/277, 278, 279, 281, 283, 284, 285,
220/287, 288, 289, 290, 291, 293, 294,
220/295, 296, 297, 298, 3.2, 3.6, 3.8, 3.9,
220/300, 301, 302, 303, 304, 305, 309.1,
220/309.2, 310.1, 314, 315, 316, 318,
220/319, 320, 321, 322, 323, 324, 325,
220/326, 327, 345.1, 345.2, 345.3, 345.4,
220/348, 350, 351, 359.1, 359.2, 359.3,
220/359.4, 359.5, 360, 361, 366.1, 367.1,
220/369, 370, 371, 372, 373, 374, 375,
220/376, 377, 378, 379, 380, 4.01, 4.02,
220/4.03, 4.04, 4.05, 4.11, 4.13, 4.21,
220/4.22, 4.23, 4.24, 4.26, 4.27, 4.28,
220/4.33, 480, 481, 483, 485, 495.01,
220/495.02, 495.03, 495.05, 495.06,
220/495.08, 495.11, 500, 501, 502, 503,
220/504, 506, 507, 510, 512, 516, 520,
220/521, 522, 523, 524, 525, 526, 529,
220/530, 533, 553, 554, 555, 556, 560.03,
220/560.1, 560.12, 560.15, 565, 568, 569,
220/570, 571, 571.1, 572, 573, 573.1,
220/573.4, 574, 574.1, 574.2, 575, 581,
220/582, 590, 592.01, 592.03, 592.17,
220/592.2, 592.21, 592.25, 592.26,
220/592.27, 592.28, 6, 600, 601, 602,
220/606, 608, 609, 611, 612, 613, 614,
220/615, 617, 618, 619, 62.11, 62.13,
220/62.18, 62.19, 62.22, 620, 621, 624,
220/625, 626, 628, 629, 630, 632, 636,
220/640, 642, 643, 646, 648, 657, 658,
220/659, 660, 662, 665, 666, 669, 670,
220/672, 675, 676, 682, 689, 694, 697, 7,
220/700, 701, 703, 705, 706, 707, 708,
220/709, 710, 710.5, 711, 712, 713, 714,
220/715, 716, 717, 719, 720, 721, 723,
220/724, 725, 727, 729, 730, 731, 732,
220/733, 735, 736, 737, 739, 740, 742,
220/744, 745, 751, 752, 756, 758, 759,
220/760, 761, 762, 763, 768, 769, 770,
220/771, 772, 773, 775, 780, 781, 782,
220/783, 784, 785, 786, 787, 788, 789,
220/790, 791, 792, 793, 794, 795, 796,
220/797, 799, 8, 800, 801, 802, 803, 804,

220/805, 806, 810, 811, 812, 813, 815,
220/816, 817, 818, 819, 820, 821, 822,
220/823, 824, 825, 826, 827, 829, 830,
220/831, 832, 833, 834, 835, 836, 837,
220/838, 839, 840, 841, 843, 844, 845,
220/846, 847, 848, 849, 86.1, 86.2, 87.1,
220/88.1, 88.2, 89.4, 9.1, 9.2, 9.4, 902,
220/906, 908, 908.1, 908.2, 909, 911,
220/912, 913, 915, 915.2, 916, DIG. 13,
220/DIG. 19, DIG. 22, DIG. 26;
220/DIG. 27, DIG. 32, DIG. 33, DIG. 34

See application file for complete search history.

(56) References Cited

U.S. PATENT DOCUMENTS

| | | | | |
|---|---|---|---|---|
| 2,736,469 | A * | 2/1956 | Stone | B65D 47/063 |
| | | | | 222/541.6 |
| 3,181,744 | A * | 5/1965 | Hales | B65D 47/061 |
| | | | | 222/542 |
| 3,831,796 | A | 8/1974 | Claasen | |
| 5,662,249 | A * | 9/1997 | Grosse | B65D 51/24 |
| | | | | 141/381 |
| 5,909,820 | A * | 6/1999 | Yeh | A47J 41/0016 |
| | | | | 220/711 |
| 8,517,216 | B2 * | 8/2013 | MacDougall | B65D 47/123 |
| | | | | 222/481.5 |
| 2009/0045206 | A1 | 2/2009 | Walker | |
| 2009/0101617 | A1 | 4/2009 | Mggiano | |
| 2014/0312077 | A1 * | 10/2014 | Tajima | A47J 41/0022 |
| | | | | 222/552 |
| 2015/0182045 | A1 | 7/2015 | Hobeich | |
| 2018/0050844 | A1 | 2/2018 | Hirst et al. | |
| 2018/0050845 | A1 * | 2/2018 | Chin | A47J 41/0016 |
| 2018/0105346 | A1 * | 4/2018 | Tolman | A47J 41/0016 |
| 2018/0235844 | A1 * | 8/2018 | Cox | B65D 41/26 |
| 2019/0161246 | A1 | 5/2019 | Lane et al. | |

FOREIGN PATENT DOCUMENTS

| | | |
|---|---|---|
| WO | 2007/069257 | 6/2007 |
| WO | 2009/121192 | 10/2009 |
| WO | 2010/003259 | 1/2010 |
| WO | 2018/228941 | 12/2018 |

OTHER PUBLICATIONS

Written Opinion from from corresponding PCT Appln. No. PCT/AU2021/051490, dated Mar. 21, 2022.

* cited by examiner

DRINKS CONTAINER

FIELD

This invention relates to a drinks container.

This invention relates particularly, but not exclusively, to a drinks container suitable for use as a water bottle when a user is exercising. It will be convenient to hereinafter describe the invention with reference to this example application. However, it is to be understood that the invention is capable of broader application.

Definition

In this specification, the term "comprising" is intended to denote the inclusion of a stated integer or integers, but not necessarily the exclusion of any other integer, depending on the context in which that term is used. This applies also to variants of that term such as "comprise" or "comprises".

In this specification and claims, the term 'shoulder' is to be interpreted broadly and in particular, it shall not be limited to any particular geometrical configuration.

BACKGROUND

A water bottle for use when exercising is a well-known contrivance. As the fitness craze has developed, more and more people are involved in regular exercise and thus it is quite common for people to carry a water bottle around with them.

One such example water bottle is shown in FIG. 1. The water bottle comprises a cylindrical container body that tapers inwardly to a neck forming an open top that can be closed by a lid. In use, the lid can be removed by a user to enable them to drink water from the bottle. A user may tend to gulp in large amounts of water from a drink bottle in a short space of time. Thus, the water bottle has a large central opening over which a user can place their mouth and draw in large amounts of water with each gulp. While it is common for a water bottle to contain water, it can also contain other drinks, including sports drinks designed to rehydrate a person after physical exercise, energy drinks or soft drinks.

Another activity that has increased in recent years is the purchase of takeaway coffee in which a coffee cup is filled by a coffee vendor and then taken away by a user. In relation to certain products, such as Starbucks™ coffees, this practice has assumed a cult-like status. Very often, hundreds of people can be seen walking through a city carrying their takeaway coffee cup in their hand.

Traditionally, single use drinks containers made of cardboard or like products have been used as a drinks container for a takeaway coffee. However, with the growing emphasis on sustainable living, there is an impetus to reuse items like cups and this has led to a rise in reusable coffee cups. These cups are carried around by a user and the same cup is reused each time they make or purchase a cup of coffee.

The reference to prior art in the background above is not and should not be taken as an acknowledgement or any form of suggestion that the referenced prior art forms part of the common general knowledge in Australia or in any other country.

SUMMARY

Applicant recognizes the prevalence of and widespread use of both water bottles and reusable coffee cups.

Applicant further recognizes that it would be beneficial to improve existing products such as water bottles and reusable coffee cups, and also to provide a greater choice for consumers.

In one form, the invention relates to a drinks container that is interchangeable between its use as a water bottle and its use as a reusable coffee cup for drinking coffee. This drinks container confers the benefit that a single drinks container can be used interchangeably as a water bottle, and as a reusable coffee cup.

Applicant recognizes that a single drinks container that provides both functions, namely, use as a water bottle providing water for rehydration, and also use as a coffee cup for sipping coffee, eliminates the need to have two separate containers and thereby the need to carry two separate containers around.

According to an aspect of the invention there is provided a drinks container comprising:

a container body having a base and a side wall terminating in a rim and forming a top, and an adapter mounted on the container body and extending across the top, which is interchangeable between a first upright configuration where it forms a substantially central primary outlet which can be opened by a user for a drink to be drunk therefrom, and a second inverted configuration in which the adapter forms a secondary outlet on the side wall of the container body such that liquid flowing out of the secondary outlet flows to the rim of the container from where it can be drunk by a user, wherein the adapter is interchanged between the first and second configurations by removing it from the container body, inverting it, and mounting it back on the container body in the second inverted configuration.

The container body may have a base and an open top.

The secondary outlet may be adjacent to the side wall of the container body such that liquid flowing out of the secondary outlet flows, e.g., across the side wall, to the rim of the container.

The adapter may be positioned in the first upright configuration for drinking a drink from the primary outlet. Further, the adapter may be removed from the container body, inverted, and mounted back on the container body in the second inverted configuration. In the second inverted configuration, a user can sip a drink flowing through the secondary outlet from the rim of the container body.

The container body may include a shoulder on the side wall, and the adapter may bear against the shoulder in each of the first upright and second inverted configurations (when the secondary outlet is closed) to seal the adapter to the container body.

The shoulder may extend substantially perpendicular to the side wall radially inward therefrom, and the shoulder may extend substantially fully around the circumference of the side wall. The shoulder may include a seal for sealing the adapter to the container body when the adapter butts up against the shoulder. The seal may comprise a resilient seal, e.g., of rubber, that is configured to complement the adapter.

Further, the shoulder may be spaced away from the rim in an axial direction of the container body, e.g., axially rearward of the rim.

The adapter may be displaced, e.g., in an axial direction, away from the shoulder to open the secondary outlet to permit liquid to flow out through the secondary outlet. That is, displacement of the adapter away from the shoulder opens a gap between the adapter and the shoulder around the circumference of the adapter that forms the secondary outlet.

The adapter may be mounted on the housing by complementary engagement formations on each of the adapter and the side wall of the container body, and the complementary engagement formations may be configured to permit the adapter to be displaced away from the shoulder to form the secondary outlet between the shoulder and the adapter, e.g., around the circumference of the shoulder.

The complementary engagement formations may be configured such that the same engagement formations are used to mount the adapter on the container body in both the first upright and second inverted configurations.

The complementary engagement formations may be configured such that rotation of the adapter on the container body axially displaces the adapter away from the shoulder to open the secondary outlet.

The complementary engagement formations may have a helical or part helical form that utilizes relative rotation of the adapter on the container body to move the adapter towards and away from the shoulder on the container body for opening and closing the secondary outlet, e.g., in the same way that rotation of a screw or screw thread formations axially displaces an element or nut along a shank.

The engagement formation on the container body may form at least one outward projecting rib and the complementary engagement formation on the adapter may form a channel within which the outward projecting rib is received, and along which the rib can be slidably displaced. With this arrangement where the rib is formed on the container body and the channel is formed on the adapter, Applicant has found there is less opportunity for liquid to be trapped on the container body surface. Applicant believes this is desirable from an operational point of view, in particular hygiene.

Alternatively, the engagement formation on the container body may form a channel and the complementary engagement formation on the adapter may form at least one outward projecting rib, e.g., two outward ribs.

The complementary engagement formations on the container body and the adapter may be rotatable, e.g., relative to each other, into a liquid passage position where they define or form a flow passage through said complementary engagement formations for liquid to flow from the secondary outlet to the rim of the container.

The complementary engagement formations on each of the container body and the adapter may extend around part of their circumferences, leaving another part of the circumferences of the container body and adapter respectively free of said engagement formations, and said other parts of the circumferences may be aligned with each other in the liquid passage position. This thereby forms the flow passage for liquid to flow through (or past) the complementary engagement formations.

In one form, the engagement formation on the container body may comprise two ribs or rib sections that are diametrically opposed to each other.

Each rib may comprise a single arc and may extend for not more than 25% of the circumference of the container body, preferably not more than 15% of the circumference of the container body. In this form, these ribs may be used for a bayonet type connection.

By contrast, the channel formed on the adapter that receives the ribs may extend around at least 60% of the circumference of the adapter.

Thus, neither the rib elements nor the channel extends fully around the circumference of the adapter, so that when they are in the liquid passage position, a liquid flow passage is formed through the complementary engagement formations. A gap in the engagement formation on the container body is aligned with a gap in the complementary engagement formation on the adapter in the liquid passage position, e.g., when the secondary outlet is opened. The flow passage formed through the ribs and the channel enables liquid to flow out of the secondary outlet and along the container body towards the rim of the container body.

The drinks container may include a liquid passage indicator for indicating, e.g., to a user, when the complementary engagement formations have been rotated, e.g., relative to each other, into the liquid passage position forming the flow passage therethrough for enabling liquid to flow from the secondary outlet to the rim.

The liquid passage indicator may comprise check formations on the adapter and/or the container body that act to check, or halt, rotation of the adapter on the container body when the complementary engagement formations have been rotated into the liquid passage position.

In one embodiment, the check formations may comprise tabs on the side wall of the container body and an outer circumferential surface of the adapter respectively, that interfere with rotation of the adapter on the container body and thereby signal to a user when the adapter is positioned with the complementary engagement formations in the liquid passage position.

The drinks container may include a sipping point indicator on the rim, e.g., for indicating a suitable point for sipping a drink. The sipping point indicator may be longitudinally aligned with the flow passage through the complementary engagement formations when they are in the liquid passage position.

The rim of the container may be sloped so that it extends at an acute angle to a longitudinal axis of the container body and forms a pinnacle on the sloped rim that projects axially proud of a remainder of the rim. The sipping point indicator may be formed by the pinnacle. The pinnacle intuitively indicates a sipping point on the rim to a user because it is outward of the rest of the rim and is therefore a natural point for a user to sip a drink from.

The drinks container may include a closure releasably mounted on the primary outlet that can be selectively removed by a user. The closure can be selectively removed, e.g., manually to enable a user to drink from the primary outlet.

The closure may comprise a bayonet type connection for mounting the closure on the container body to close off the primary outlet. Instead, the closure may comprise a screw thread type connection mounting the closure on the container body.

The primary outlet and closure may be substantially centrally positioned on the container body, and in the first upright configuration the primary outlet and closure may form a top of the drinks container.

The container body may have a circular cross-sectional configuration, and the adapter may have a complementary circular cross-sectional configuration that is sized to be received within the container body.

The adapter may have a first end that is configured to be received within the container body with a clearance, e.g., a small clearance, and a second end forming the primary outlet. The adapter may include a frusto-conical section intermediate the first and second ends that tapers inward towards the second end. The adapter may further include a neck adjacent to the second end.

The adapter may include a circumferential outer surface adjacent to the first end, and the complementary engagement formation may be formed on the circumferential outer surface.

In the second inverted configuration, the adapter can initially be positioned in engagement with the shoulder on the container body closing the secondary outlet and stopping the flow of liquid out of the secondary outlet. In use, the adapter is rotated on the container body in a direction that displaces the adapter away from the shoulder to open the secondary outlet and allow liquid to flow out of the secondary outlet towards the rim of the side wall. A user can then sip the drink, e.g., a hot drink, from the rim.

The adapter may include a handle formation formed thereon for enabling a user to rotate the adapter on the container body in the second inverted configuration. The handle formation may be formed on the frusto-conical section of the adapter. In particular, the handle formation may be formed on an outward facing surface of the frusto-conical section of the adapter when the adapter is in the second inverted configuration.

The side wall of the container body may have an inner surface and the engagement formation for engaging the complementary engagement formation on the adapter may be formed on the inner surface.

The container body may comprise a first container element and a second container element that is circumferentially mounted over the first container element, and wherein the second container element is removable from the first container element to provide a separate second drinks container for holding a drink.

The second container element may be removably mounted on the first container element by friction and be removed by a user manually sliding the second container element off the first container element in an axial direction.

The second container element that can be slipped off the first container element provides a second drink container confers further versatility and optionality on the drinks container.

According to another aspect of the invention there is provided a drinks container comprising:
 a container body having a side wall terminating in a rim, and
 an adapter mounted on the container body, which is interchangeable between a first upright configuration in which it forms a primary outlet, and a second inverted configuration in which the adapter forms a secondary outlet.

The drinks container may include any one or more of the features in the other aspects of the invention either alone or in combination.

BRIEF DESCRIPTION OF THE DRAWINGS

A drinks container for a user in accordance with the invention may manifest itself in a variety of forms. It will be convenient to hereinafter describe in detail two embodiments of the invention with reference to the accompanying drawings. The purpose of providing this detailed description is to instruct persons having an interest in the subject matter of the invention how to carry the invention into practical effect. However, it is to be clearly understood that the specific nature of this detailed description does not supersede the generality of the preceding summary section. In the drawings.

DETAILED DESCRIPTION OF THE DRAWINGS

Figure 1:
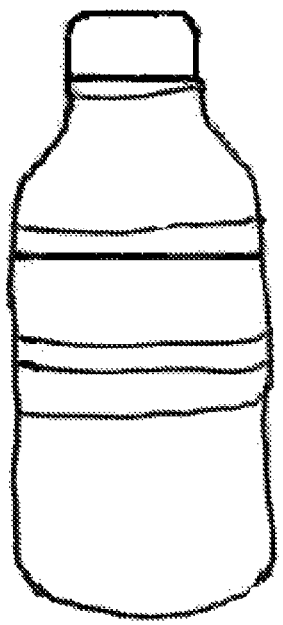
FIG. 1 is a front view of an example water bottle known in the prior art.
Figure 2:
FIG. 2 is an upper perspective view of a reusable cup known in the prior art for holding a hot drink such as coffee.

FIGS. 1 and 2 illustrate drinks containers that are known in the prior art. As these drinks containers do not form the invention defined in the current application, they will not be discussed further in this detailed description.

In FIGS. 3 to 12, reference numeral 10 refers generally to a drinks container in accordance with one embodiment of the invention.

The drinks container 10 comprises generally a container body 12 having a base 14 and a side wall 16 terminating in a rim 18 forming an open top for the container body 12. The drinks container 10 also includes an adapter 20 releasably mounted on the side wall 16 extending across the open top. The adapter 20 is interchangeable between a first upright configuration and a second inverted configuration.

In the first upright configuration shown in FIGS. 3 to 9, the adapter 20 slopes inward as it extends towards a primary outlet or primary drinking opening 26 through which a user can drink water or a sports drink from the drinks container 10. In the second inverted configuration shown in FIGS. 10 to 15, the container 10 forms a secondary outlet broadly indicated by numeral 27 that is formed between a circumferential edge of the adapter 20 and the container body 12. The secondary outlet 27 permits a liquid, e.g., a hot liquid such as coffee or tea, to be sipped from the rim 18 of the drinks container 10.

The different components of the drinks container 10 will now be described in greater detail.

As illustrated in the drawings, the container body 12 has a substantially circular cylindrical configuration and the base 14 in turn is substantially circular. It follows that the rim 18 as shown also has a corresponding circular configuration.

Figure 8:
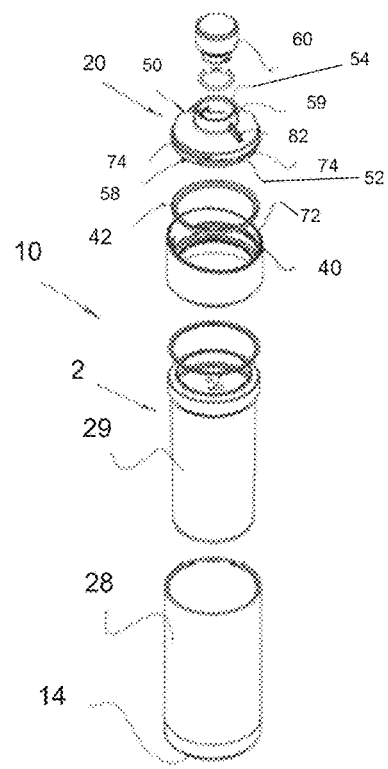
FIG. 8 is an exploded perspective view of the drinks container of FIG. 1 shown in the first configuration.
Figure 9:
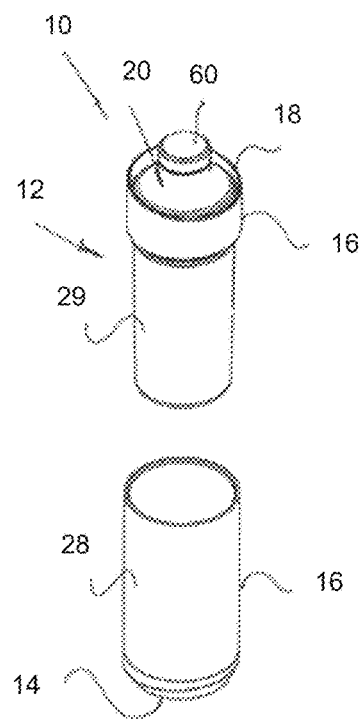
FIG. 9 is a perspective view of the drinks container of FIG. 1 shown in the first configuration with an outer cylindrical cup member removed therefrom.
Figure 12:
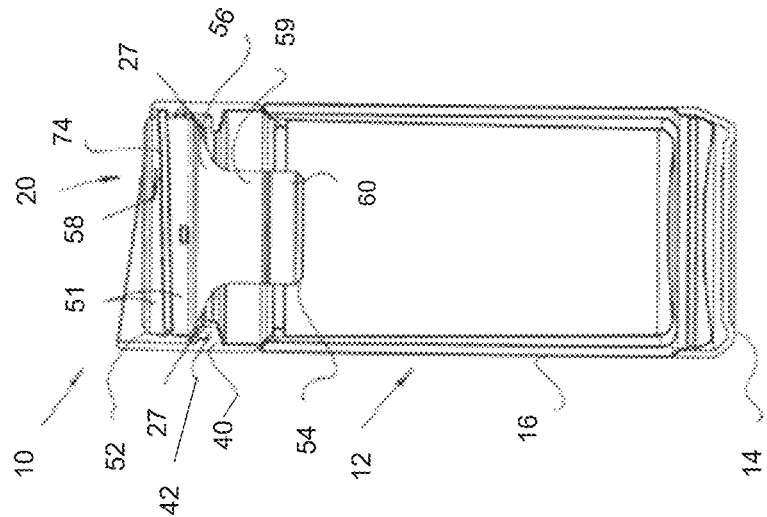
FIG. 12 is a cross sectional view of an upper part of the drinks container of FIG. 10 shown in the inverted configuration.

The container body 12 includes a second cylindrical container body part or element 28 mounted circumferentially over and around a first container body part or element 29. FIGS. 8 and 9 show the second cylindrical body part 28 mounted over the first container body part 29. The two body parts 28 and 29 are configured so that they present a smooth outer surface for the drinks container 10 as a whole, when the second container body part 28 is mounted over the first container body part 29. That is, an outer surface of the second container body part 28 forms a straight line in a longitudinal direction with an outer surface of an upper portion of the first container body part 29. In FIG. 9, the first container body part 29 has been removed from the second container body part 28 to provide two drinking receptacles. The second container body part 28 forms an open topped drinking receptacle.

The container body 12 has an inner surface 36 and a shoulder 40, projecting radially inward from the inner surface 36 that is spaced beneath the rim 18. In the illustrated embodiment, the shoulder 40 projects orthogonally away from the inner surface 36 of the side wall 14 and extends substantially around the full circumference of the side wall 14.

Further, the shoulder 40 is configured to form a recess within which a rubber seal 42 is received. The rubber seal 42 is used to seal the adapter 20 to the inner surface 36 of the container body 12 in both its first and second configurations as will be described in more detail below.

The structural features of the adapter 20 which are shown in some detail in FIGS. 3 to 15 will now be described in more detail below. The adapter 20 comprises an adapter body 50 having a broadly circular configuration when viewed in plan view when mounted on the container body 12. Broadly, the adapter body 50 has a wide first end 52 forming an adapter base 58 having a circumferential outer surface 51, and an opposed narrow second end 54 adjacent to a narrow cylindrical section or neck 59. The adapter base 58 is sized and configured to be received with a small clearance within an inner surface 36 of the wall 14 of the container body 12 in both the first and second configurations.

The adapter body 50 includes a conical section 56 intermediate the adapter base 58 and the narrow cylindrical section or neck 59. The conical section 56 tapers radially inward in a direction away from the base 58 and then transitions into the neck 59. The primary opening or primary outlet 26 (which can be used when the adapter 20 is in the first configuration) is formed by the second end 54 and has a removable closure or lid indicated by reference numeral 60 mounted thereon. The closure 60 can be removed by a user when the adapter 20 and container 10 is in the first upright configuration for drinking from the container 10.

The adapter 20 is operatively mounted on the container body 12 by complementary engagement formations, e.g., by screw formations or screw threads on respectively the container body 12 and the adapter 20.

Figure 16:
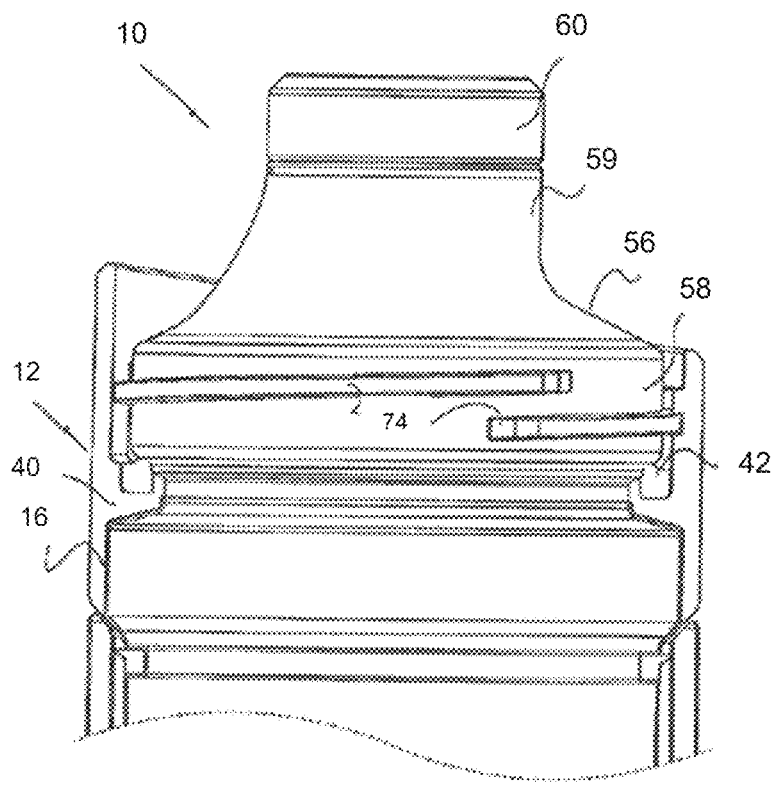
FIG. 16 is a close up sectional view showing additional detail of an upper part of the drinks container in the first upright configuration shown in FIG. 1.
Figure 17:
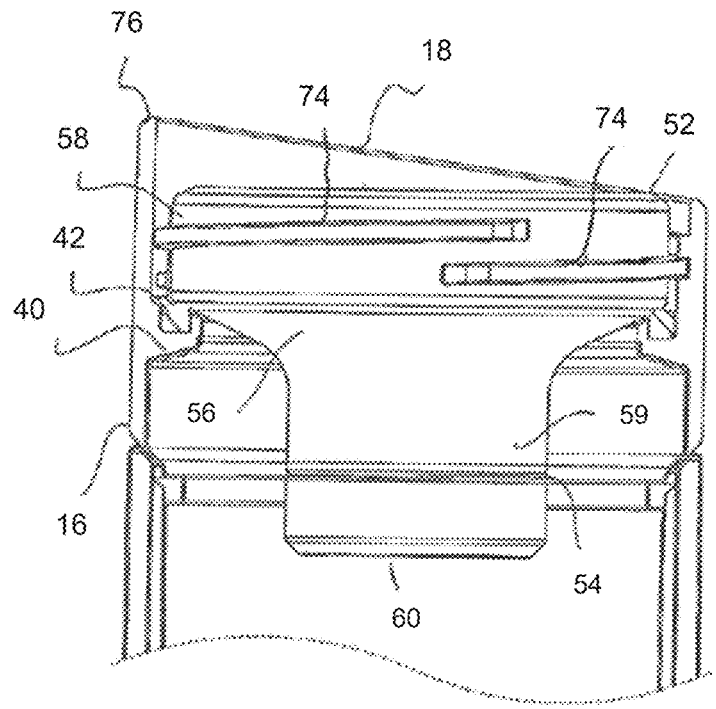
FIG. 17 is a close up sectional view showing additional detail of an upper part of the drinks container in the second inverted configuration shown in FIG. 10.
Figure 18:
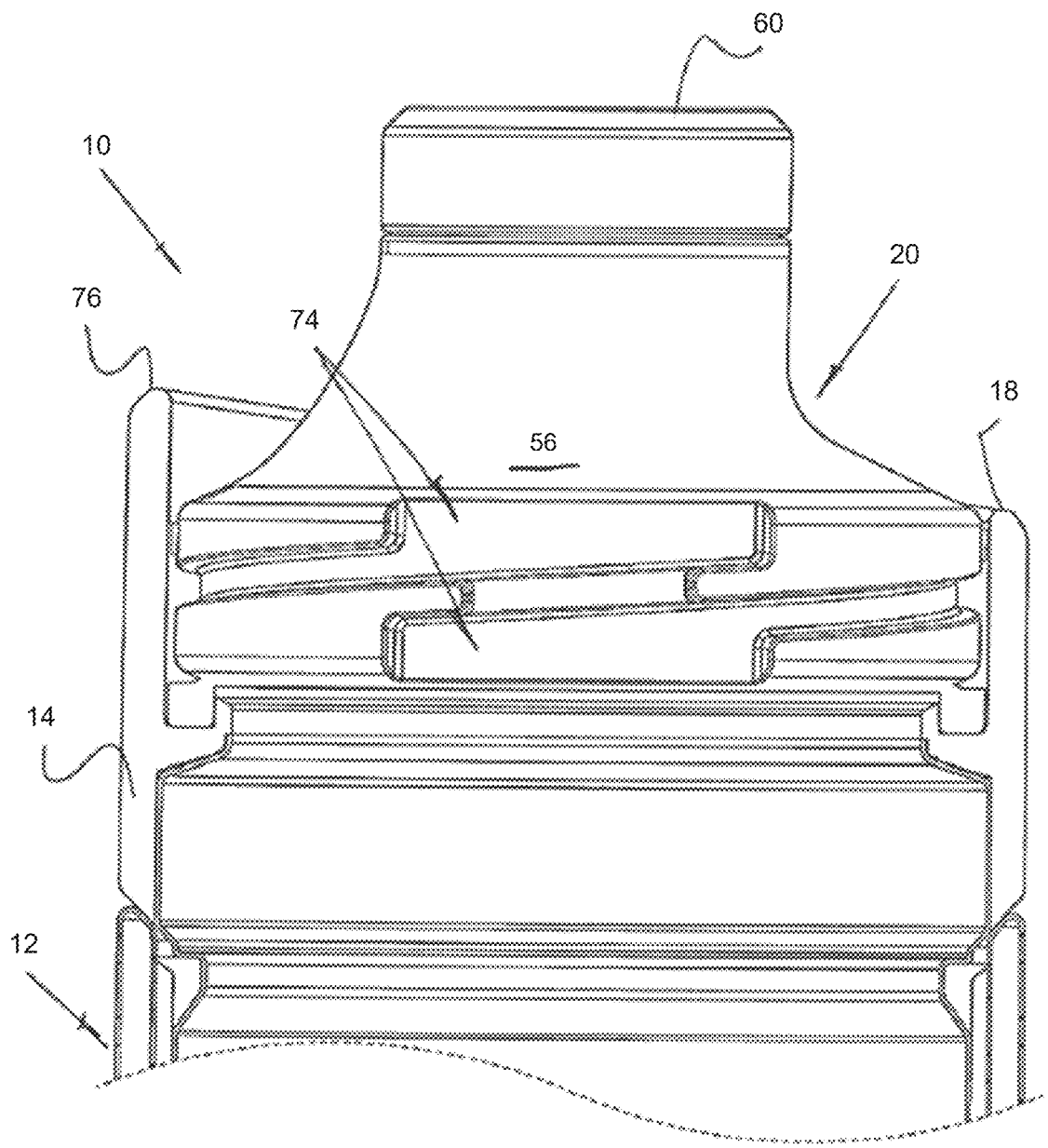
FIG. 18 is a sectional view of part of a container in accordance with a second embodiment shown in the first upright configuration.

An engagement formation 72, e.g., a screw thread, is formed on the inner surface 36 of the container body 12 as shown in the drawings and in particular in FIGS. 16 and 17.

In turn, the circumferential outer surface 51 of the adapter base 58 has a complementary formation 74 formed thereon, e.g., an external screw thread, that is complementary to the screw thread 72, i.e., it is sized and configured to engage with the screw thread 72, on the container body 12.

The complementary engagement formations 74 and 72 on the adapter body 50 and the container body 12 respectively, are configured such that the same threads are used to releasably mount the adapter 20 on the container body 12 in both the first upright and the second inverted configurations. The use of the same screw threads 72, 74 for mechanically attaching the adapter 20 on the container body 12 in both the first and second configurations is beneficial because it simplifies both structure and manufacture.

When the complementary engagement formations 72, 74 are fully turned in one direction as far as they can go, the adapter body 50 and specifically the base 58 thereof, butts up against the shoulder 40, and specifically the seal 42 on the shoulder 40, to close the secondary outlet 27 and stop liquid from passing out of it. The axial position of the adapter body 50 on the container body 12 can be moved by rotating or turning the adapter body 50 on the container body 12 to displace the adapter 12 away from the shoulder 40 and open up the secondary outlet or opening 27 through which liquid can pass. The secondary outlet 27 is formed by a gap or spacing that forms between the adapter body 50 and the shoulder 40, when the adapter body 50 is displaced away from the shoulder 40. In the illustrated embodiment, the secondary outlet 27 extends circumferentially around the container body 12 adjacent the inner surface 36 thereof.

Another structural feature that contributes to the functioning of the drinks container 10 is that the screw thread 72 on the container body 12 is formed with a gap or interruption along its length to permit liquid to flow out of the secondary outlet 27 and also flow past the screw thread 72 to the rim 18. Similarly, the adapter 20 also has an interruption or gap along the length of its screw thread 74 to permit liquid flowing out of the container to also flow past the screw thread 74. The gap in the external screw thread 74 on the adapter body 50 is arranged so that when the adapter body 50 rotates relative to the container body 12 sufficiently to open the secondary outlet, the gap in the external screw thread 74 is aligned with the gap in the screw thread 72 to allow liquid from the secondary outlet 27 to flow past the screw threads 72 and 74 to the rim 18. This is called the liquid passage position of the complementary engagement formations 72, 74 and defines a flow passage through or past the formations 72 and 74 for liquid discharging from the secondary outlet 27. The interaction of the engagement formations 72, 74 with each other in respectively the first and second configurations is shown most clearly in FIGS. 16 and 17.

Figure 5:
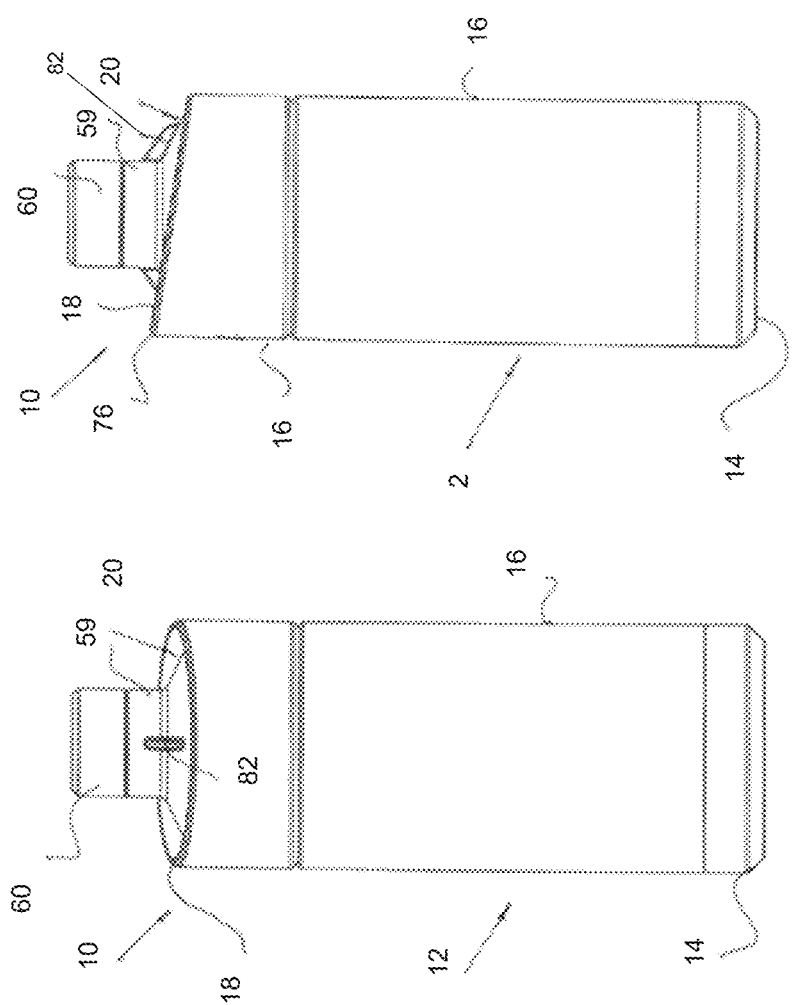
FIG. 5 is a side view of the drinks container of FIG. 3 shown in the first configuration.
Figure 4:
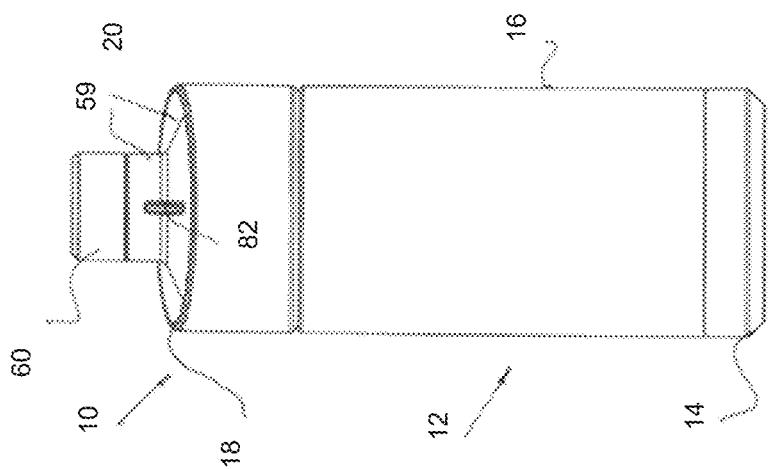
FIG. 4 is a front view of the drinks container of FIG. 3 shown in the first configuration.
Figure 7:
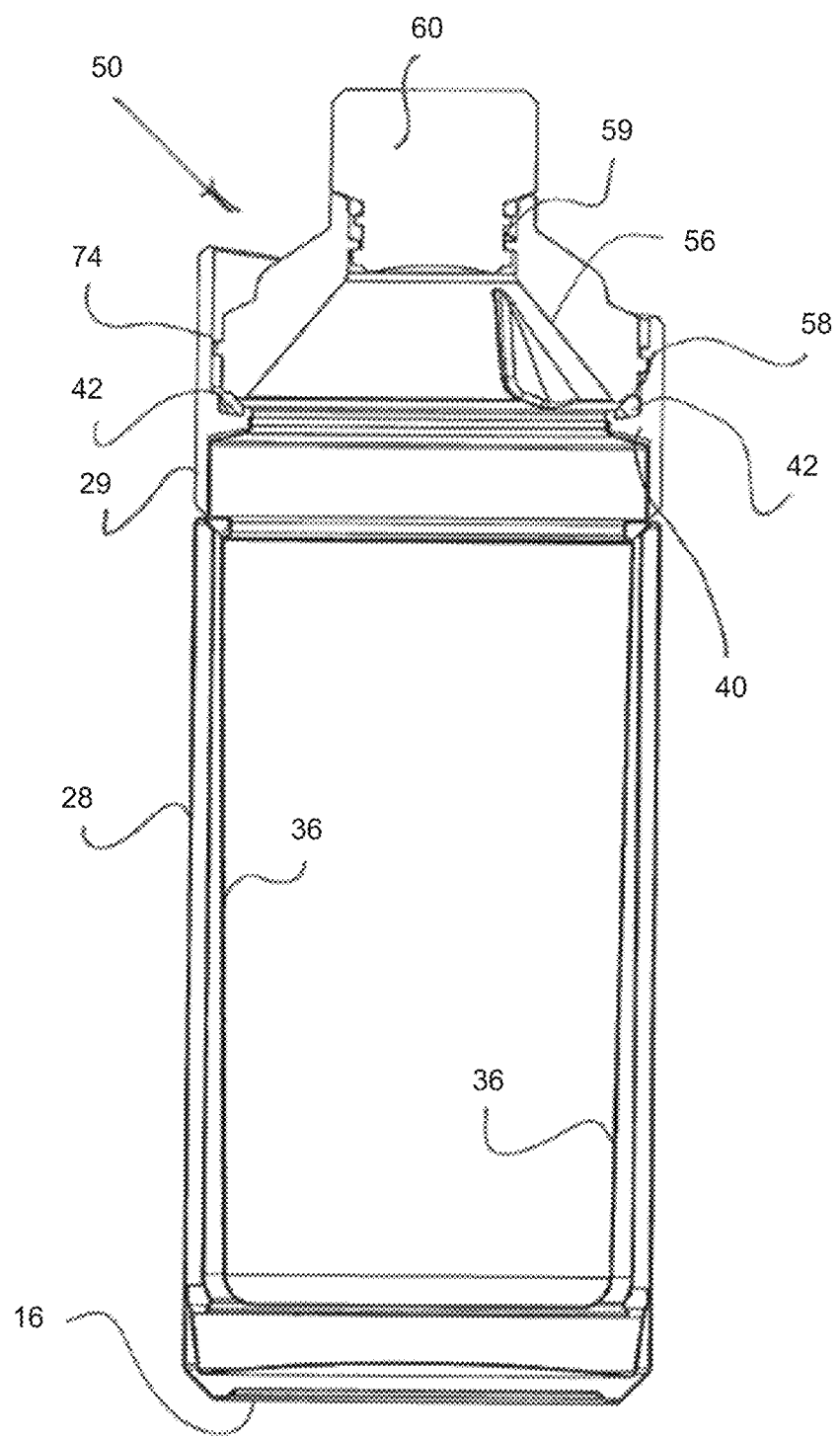
FIG. 7 is a cross-sectional view of the drinks container of FIG. 1 shown in the first configuration.

The rim 18 of the container is sloped as shown most clearly in FIGS. 4 and 5, e.g., so that it does not extend perpendicularly to a longitudinal axis of the container body 12. This way the rim 18 has a pinnacle or sipping portion 76 that extends proud of the remainder of the rim 18. It will be appreciated that the pinnacle 76 will be a natural point on the rim 18 of the container 10 for a person to sip a drink from, because it stands proud of the rest of the rim 18. The liquid therefore needs to flow from the outlet 27 to this part 76 of the rim 18. To assist with this, the flow passage through the formations 72, 74 in the liquid passage position is longitudinally aligned with the pinnacle 76 of the rim 18 of the container body 12. This guides liquid flowing through the flow passage in the liquid passage position of the engagement formations towards the pinnacle 76 of the rim 18.

Additionally, the adapter 20 has a handle formation 82 projecting out therefrom when in the first configuration for assisting a user to rotate the adapter 20 on the container body 12 to attach it to the container body 12. In the embodiment illustrated in FIG. 3, the handle formation 82 comprises two diametrically opposed tabs projecting up from an outward facing surface of the conical section 56 of the adapter body 50.

Figure 3:
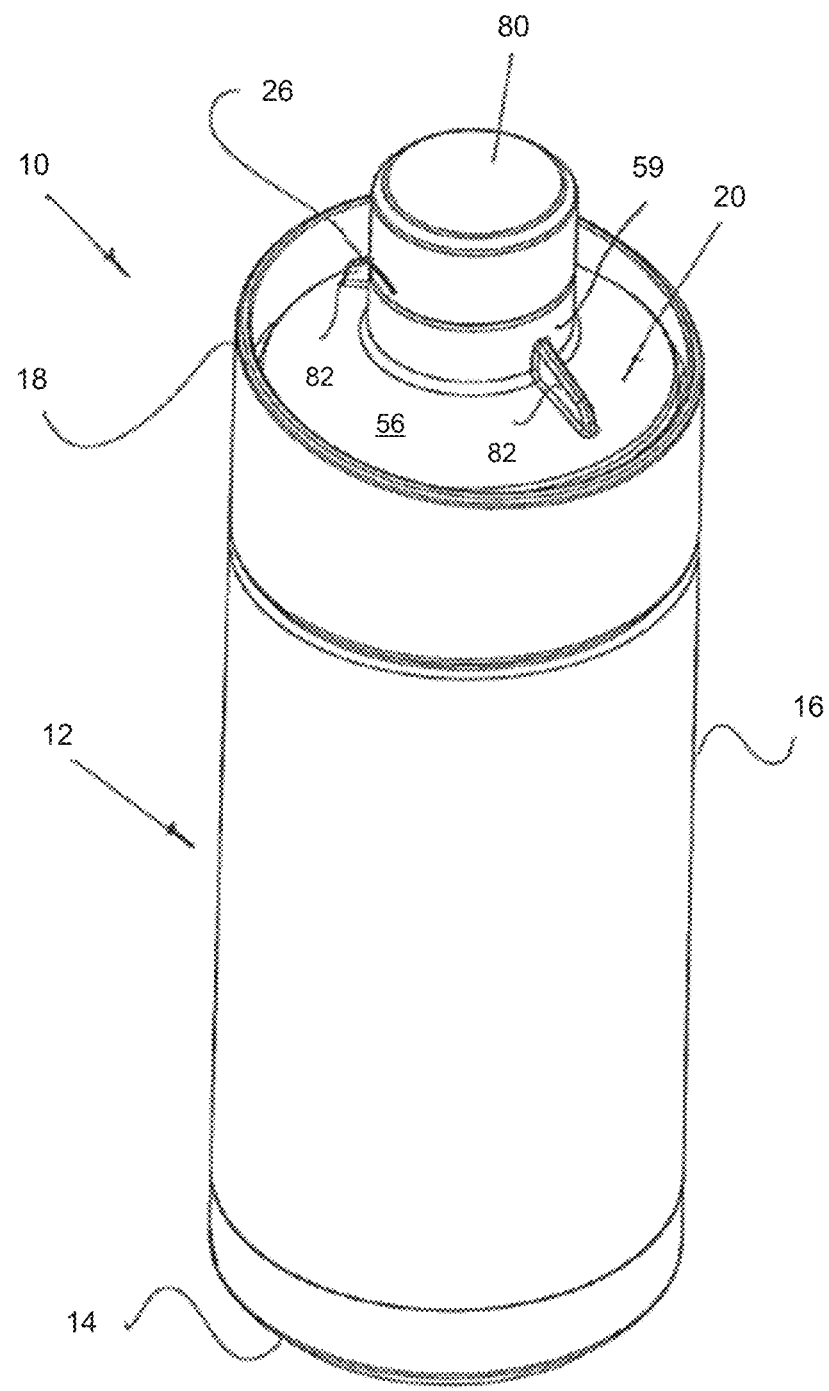
FIG. 3 is an upper perspective view of a drinks container in accordance with one embodiment of the invention shown in a first upright configuration.
Figure 6:
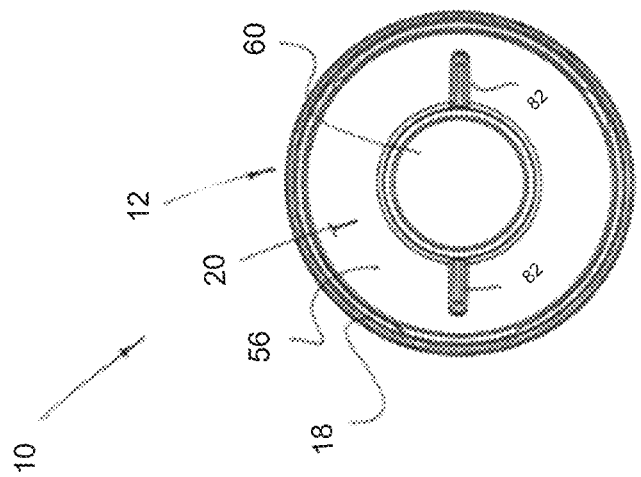
FIG. 6 is a top plan view of the drinks container of FIG. 1 shown in the first configuration.

Further, on an opposed surface or inward facing surface of the adapter body 50 in FIG. 3, there is a further handle formation 84 which projects up from the adapter body 50 in the second inverted configuration. This further handle formation 84 enables a user to attach and fasten the adapter 20 to the container body 12 in the second configuration. This assists a user to displace the adapter 20 away from the shoulder 40 to open the secondary outlet 27 so liquid flows through the secondary outlet 27 and over the rim 18 of the container body 12.

In use, the drinks container 10 may, for example, be used as a water bottle or sports drink bottle in the first configuration shown in FIGS. 3 to 9. The adapter 20 is mounted on the container body 12 in the first or upright configuration and tapers inward and upward to the primary outlet or primary opening 26 which is closed off by the removable closure or lid 60. Typically, the bottle or container 10 is used in this configuration when a user is exercising, and they need to hydrate. As and when required, the user can selectively remove the lid 60 for them to drink liquid through the primary outlet 26. In this configuration, the base 58 of the adapter body 50 butts up against the shoulder 40 and seals the circumferential surface of the adapter 20 to the container body 12 so liquid cannot flow out of the secondary outlet 27.

When the drinks container 10 is to be used for a second and different purpose, namely sipping a drink from the rim 18 of the container body 12, the adaptor can be changed into the second inverted configuration shown in FIGS. 10 to 15.

To do this, the adapter 20 is turned or rotated relative to the container body 12 in one direction until it separates or detaches from the container body 12. It is then inverted (or turned upside down) so that the adapter base 58 is uppermost and the neck 59 is lowermost and then mounted back on the container body 12. In this inverted configuration, the neck 59 and closure 60 on the adapter body 50 are received within an interior space of the container body 12. The closure 60 closes off the primary outlet 26 blocking liquid flow through the primary outlet 26.

So long as the adapter 20 is fully (and tightly) engaged with the container body 12, the adapter body 50 bears against the seal 42 on the shoulder 40 and closes off the secondary outlet 27 effectively sealing the container 10.

Figure 11:
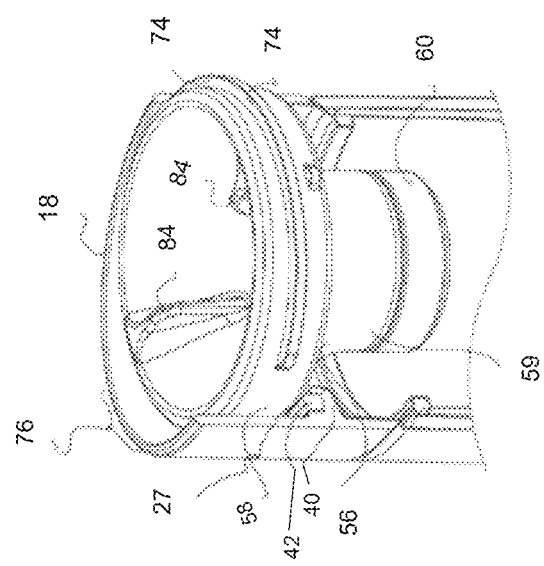
FIG. 11 is an upper perspective view of an upper part of the drinks container of FIG. 10 with the adapter shown in the inverted configuration.
Figure 10:
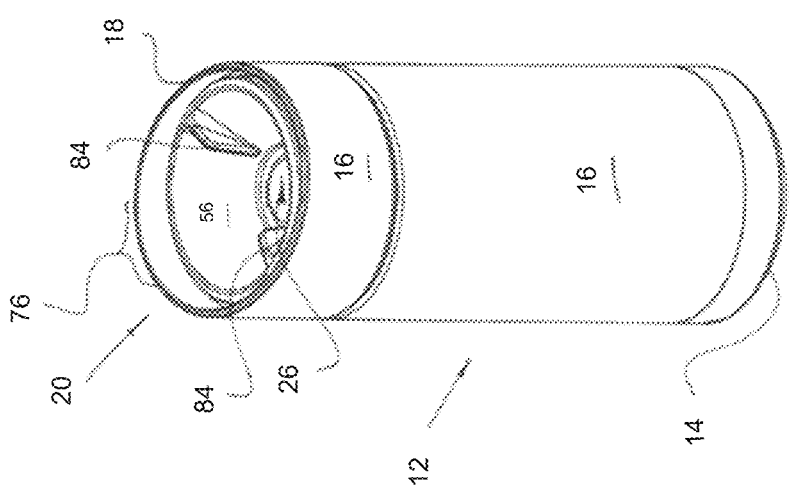
FIG. 10 is an upper perspective view of the drinks container of FIG. 1 shown in a second inverted configuration.
Figure 13:
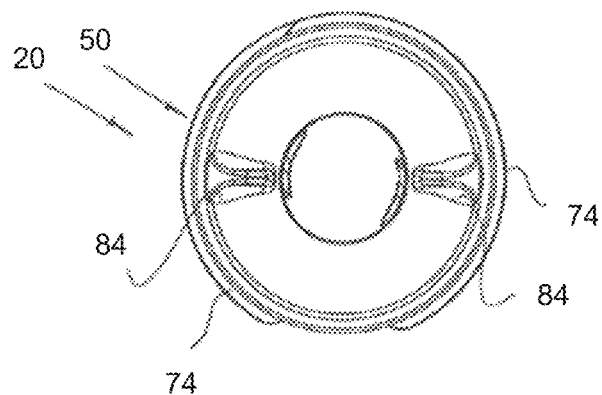
FIGS. 13 to 15 show top plan, perspective and front views of the adapter of the container in FIGS. 3 to 12.
Figure 14:
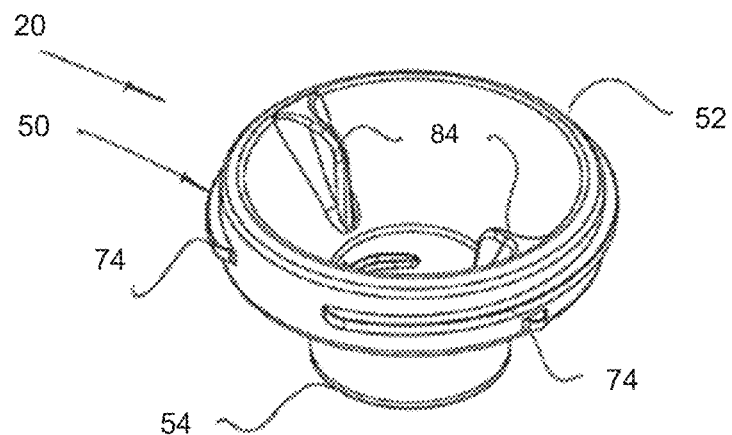
Figure 15:
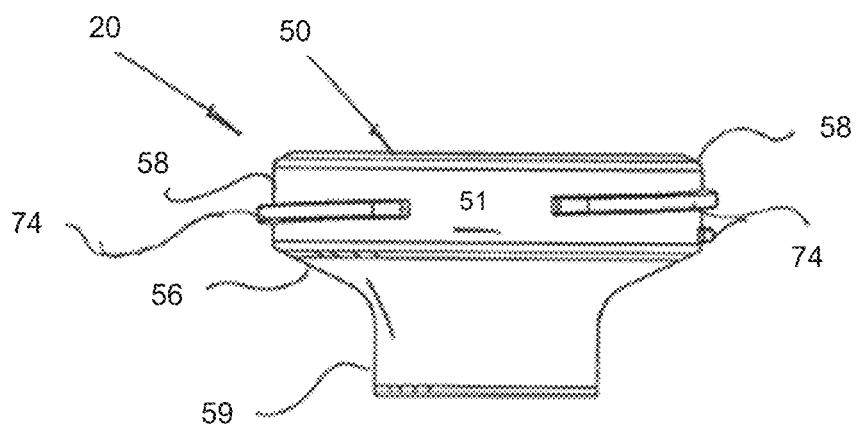

When a user desires to drink liquid from the drinks container 10 through the secondary outlet or opening 27, the adapter body 50 is turned in a reverse direction to that used to fasten it on the container body 12. That is, it is rotated to displace the adapter body 50 away from the shoulder 40 leaving a gap between adapter body 50 and the shoulder 40 forming the secondary outlet 27 through which liquid can pass. The liquid can pass through the outlet 27 and then past the complementary engagement formations 72, 74 on the body 12 and the adapter 20. As described above, there are gaps or interruptions in the continuity of each of the complementary engagement formations 72, 74 forming a flow passage through the engagement formations though which the liquid can flow to the rim 18. This is shown in FIG. 11 where the adapter 20 is displaced away from the shoulder 40 opening the secondary outlet 27.

In the second inverted configuration, a user can comfortably sip liquid from the pinnacle 76 of the rim 18 of the container 10. The gap in the screw thread 74 on the adaptor 20 is aligned with the gap in the screw thread 72 on the container body 12 so that liquid flows past the engagement formations 72 and 74. Further as described above, the flow passage formed through a barrier formed by the engagement formations is aligned with the pinnacle 76 of the rim 18 (so that liquid flows towards the pinnacle). In the second inverted configuration, the drinks container 10 is suited to sipping a drink more slowly from the rim, e.g., a hot drink such as coffee or tea, rather than drinking large quantities from the primary outlet 26.

Further, as described above, the container body 12 comprises a second container part 28 circumferentially mounted on the first body part 29. In use, the second container part 28 can be slid off the first body part 29 and used to provide a second drinking cup for a second person or a second drink. For example, this might be used by couples to share a drink.

FIGS. 18 to 23 illustrate a drinks container 10 in accordance with a second embodiment. This embodiment has many similarities with the first embodiment and accordingly, unless otherwise indicated, the same reference numerals will be used to refer to the same components. Further, the following description will focus on the differences between this embodiment and the first embodiment.

The secondary outlet 27 is formed in the same way as in the first embodiment by the shoulder 40 on the container body 12 and the body 50 of the adapter 20 which engages the body 12. The body 50 is displaced away from the shoulder 40 by rotation of the adapter 20 on the body 12 to open the secondary opening 27 to enable liquid to pass there through.

The adapter 20 is operatively mounted on the container body 12 by complementary engagement formations 74 and 72, e.g., complementary helical or screw thread formations on respectively the adapter 20 and the body 12. The complementary rib and channel engagement formations 72, 74 provide for a secure mounting of the adapter 20 on the container body 12 while permitting the secondary outlet 27 to be selectively opened for liquid to flow out of the container 10.

More specifically in the second embodiment, the container body 12 has an inner surface 36 on which at least one outward or external rib or screw thread 72 is formed. In turn, the circumferential outer surface 51 of the adapter base 58 has a channel formation or internal screw thread 74 formed thereon that is complementary to the external rib or screw thread 72. That is, it is sized and configured to engage with the external rib 72 on the container body 12.

The complementary engagement formations 74, 72 on the adapter body 50 and the container body 12 are configured such that the same engagement formations are able to be used (to releasably mount the adapter 20 on the body 12) in both the first upright and the second inverted configurations. The use of the same formations 72, 74 2 in both the first and second configurations simplifies both structure and manufacture of the components.

The external ribs 72 on the inner surface of the body 12 will now be described in more detail. This embodiment comprises two short ribs or rib sections 72 that each extend a small distance around the circumference of the side wall 14. Further, the two rib or rib sections 72 may be diametrically opposed to each other when the container body 12 is viewed in a plan view. This provides a suitable passage or path on the surface of the container body 12 for liquid to flow past the ribs 72 to the rim 18 when the adapter 20 is in the inverted second configuration.

Figure 19:
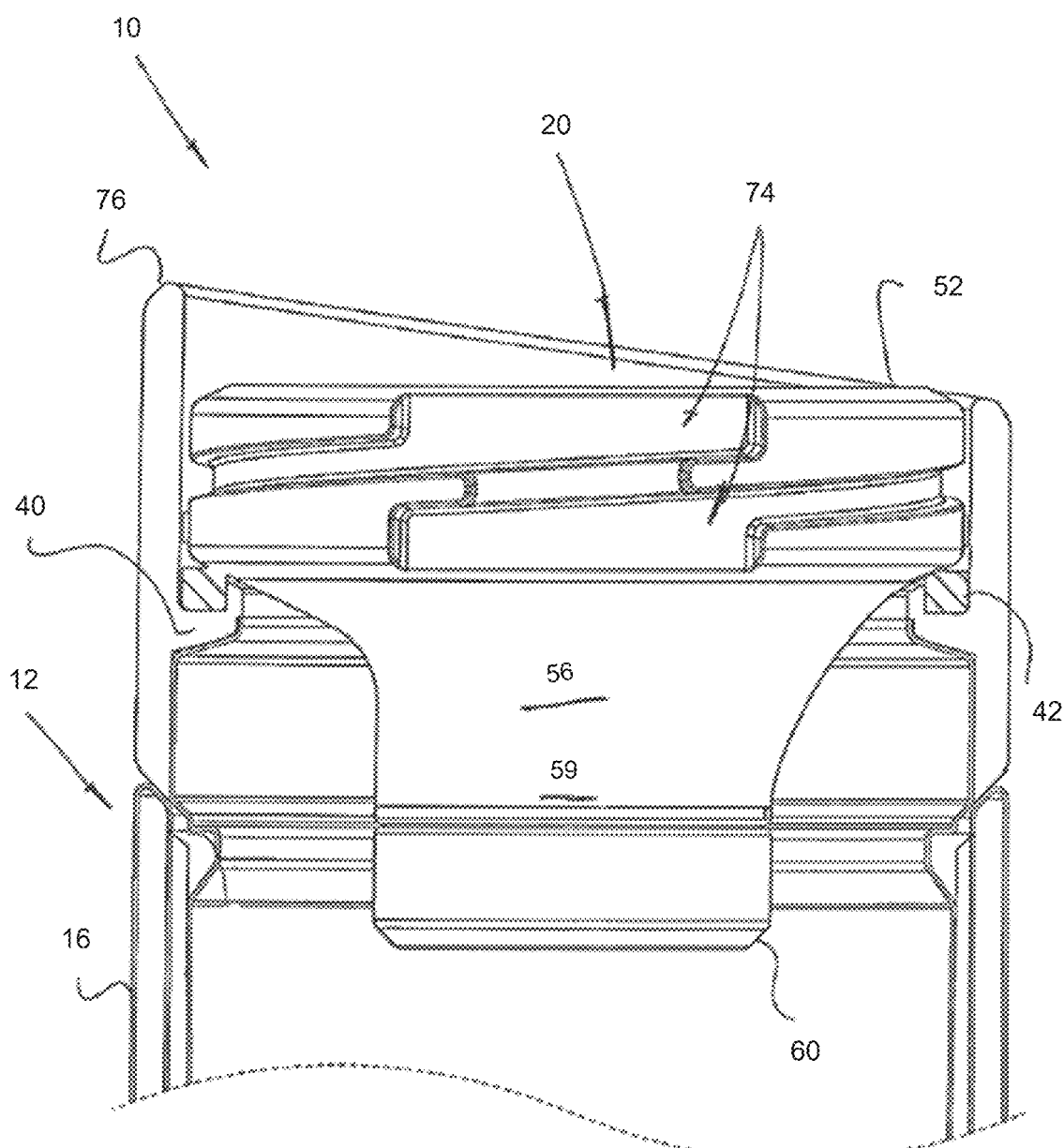
FIG. 19 is a sectional view of the container of FIG. 18 shown in the second inverted configuration.
Figure 20:
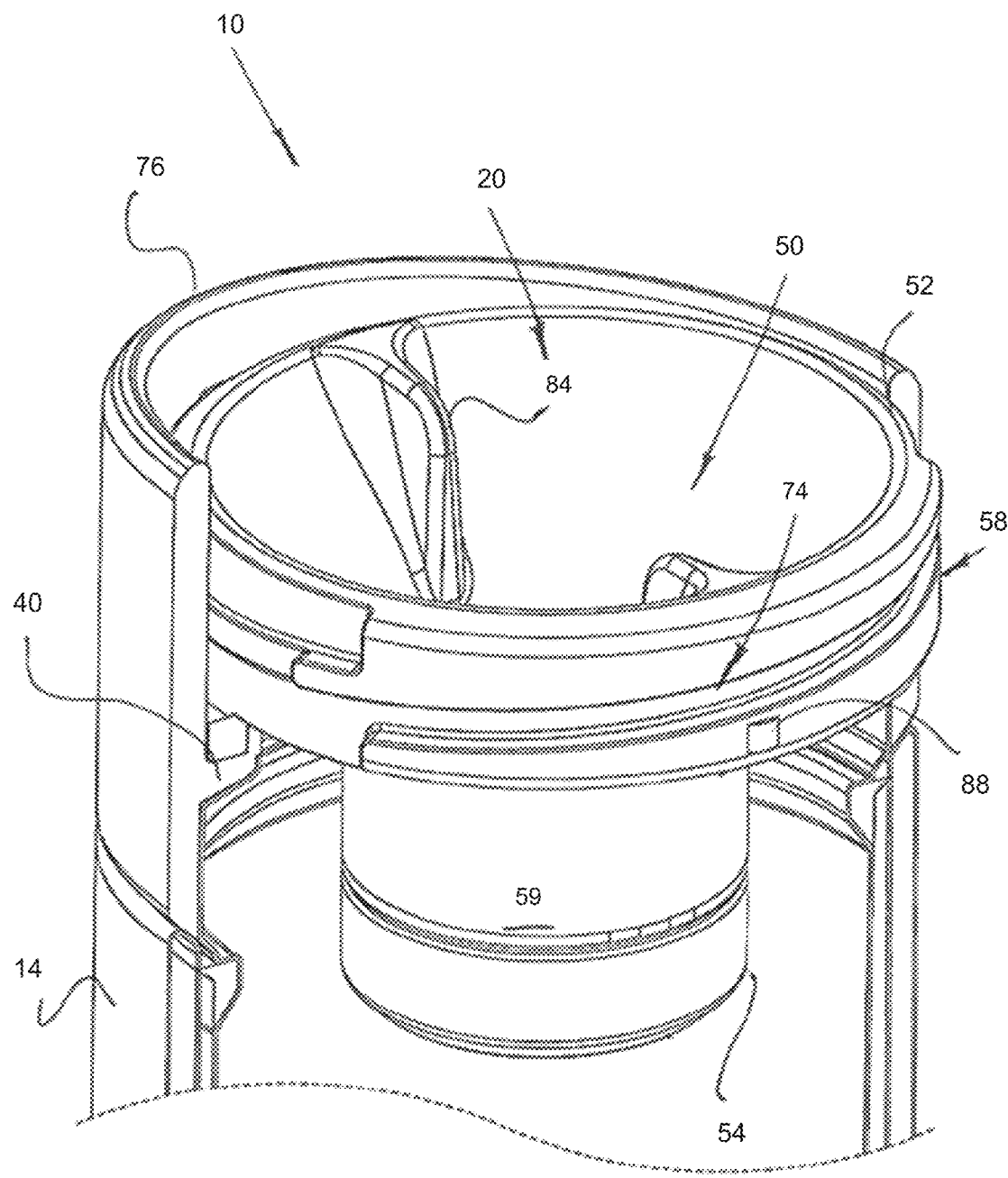
FIG. 20 is an upper perspective view of the container of FIG. 18.
Figure 22:
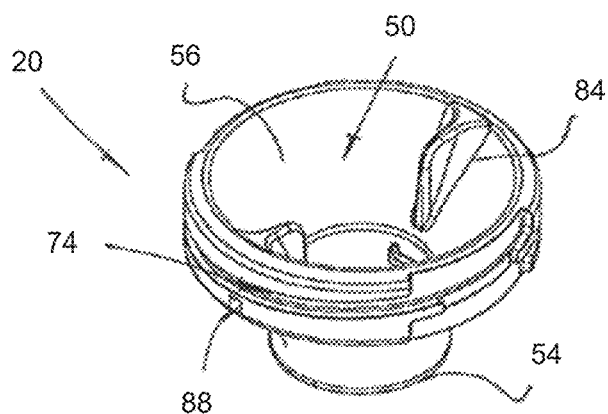
FIG. 22 is an upper perspective view of the adapter of FIG. 21.
Figure 23:
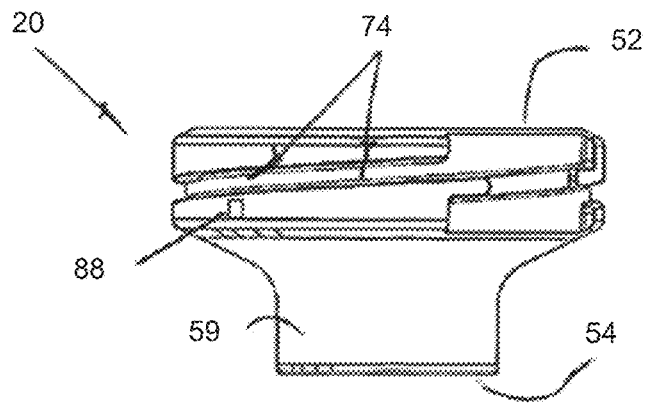
FIG. 23 is a front view of the adapter of FIG. 21.

The channel or channel formation 74 or internal screw thread formed on the adapter 20 by contrast extends around a large part of the circumference of the adapter 20. It has two gaps or interruptions around the circumference of the adaptor 20, which gaps can be aligned with the spaces between the ribs 72 on the container body 12. The gaps in the ribs 72 and the channel 74 are aligned with each other in a liquid passage position forming a flow passage through these engagement formations 72 and 74 leading to the rim 18. The channel 74 and the gaps formed along a length of the channel formation 74 are shown in FIGS. 19, 20 and 22 of the drawings in particular.

The container body 12 also has check formations 88 for indicating to a user to check or stop rotation of the adapter 20 on the container body 12 in a check position where the secondary outlet 27 has been opened and the ribs 72 and channel 74 are in the liquid passage position forming a flow passage through the formations 72, 74.

In the illustrated embodiment, the check formations 88 comprise projections on the outer surface of the adapter body 50 that engage with complementary formations on an internal surface of the wall 14 of the container body 12. The check formations 88 are sufficiently large to check movement of the adapter 20 but are sized to permit the user (with the application of additional force) to displace the adapter 20 past the projections, e.g., if they want to separate or detach the adapter 20 from the body 12.

As described above for the first embodiment, neither the ribs nor the channel interferes with flow of the liquid from the secondary outlet 27 to the pinnacle 76 on the rim 18 when the complementary formations 72, 74 are in the liquid flow passage position. The check formations 88 assist a user to position the complementary formations in the liquid passage position.

In use, the drinks container 12 is filled with a drink to be sipped and the adapter 20 is screwed onto the container body 12 in the second inverted configuration. A first rotation of the adapter 20 results in a checking engagement of the check formations 88 which checks rotation of the adapter 20. The user then applies more force to urge the adapter 20 to rotate past the check formations 88 until the adapter 20 is stopped and can rotate no further. In this position, the adapter body 50 seals against the shoulder 40 on the container body 12 and the secondary opening 27 is closed.

When a user desires to drink from the rim of the container body 12, they rotate the adapter 20 back from the closed position (i.e., in an opposite direction to the first rotation above) to the check position in which the check formations 88 check rotation of the adapter 20. This opens the secondary opening 27 and forms a flow passage through the engagement formations 72, 74. When the drinks container is raised by a user for drinking, liquid flows out of the secondary opening 27 through the flow passage formed in the complementary engagement formations 72, 74 and across the surface 36 of the container wall 14 to the pinnacle 76 on the rim 18.

Figure 21:
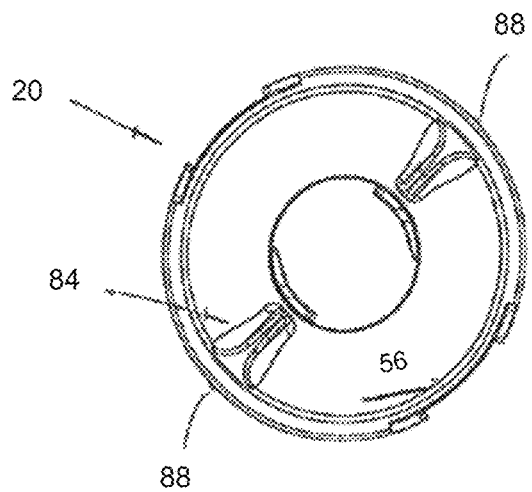
FIG. 21 is a top plan view of the adapter of the container of FIG. 18.
Figure 24:
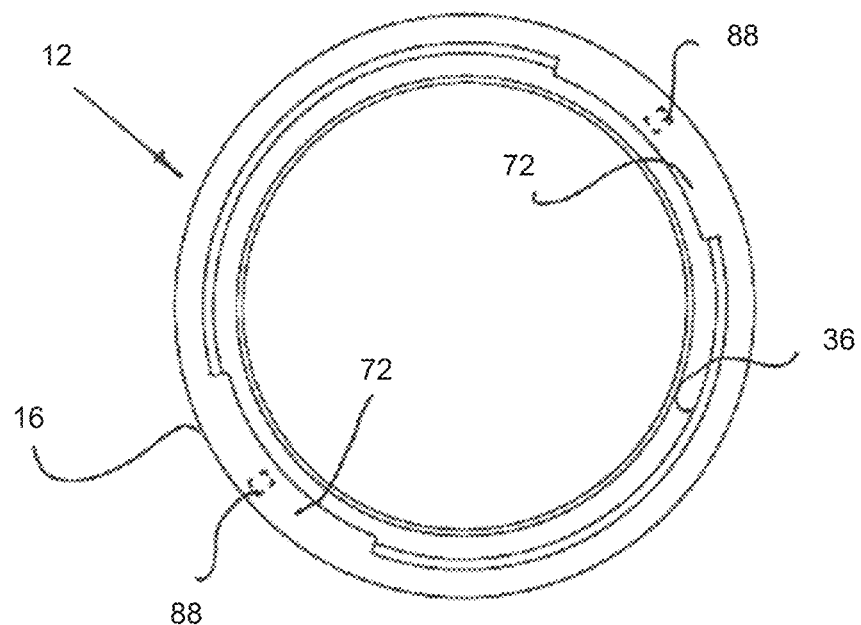
FIG. 24 is two schematic plan views of the container body of the drinks container shown in FIG. 18 (with some detail omitted for clarity).

The arrangement of the container body 12 and the adapter 20 relative to each other to form the flow passage through the engagement formations is shown schematically in FIGS. 21 to 24. FIGS. 21 and 24 respectively show the position of the channel 74 on the adapter 20 and the position of the ribs 72 on the container body 12 which is suitable for drinking liquid from the secondary opening 27. The gap in the ribs 72 aligns with the gap in the channel 74 creating a liquid passage from the secondary outlet 27 to the pinnacle 76 of the rim 18. Further, in this position, the check formations 88 on respectively, the container and the adapter, are in the same relative position as shown in the drawings.

An advantage of the drinks container described above with reference to the drawings is that it provides a single container that can be interchanged between an exercise bottle for hydrating a user during exercise, and a re-usable cup, e.g. a reusable coffee cup for sipping a drink.

The container provides this interchangeability by means of an adapter that can be changed from a first upright configuration to a second inverted configuration by simply detaching the adapter from the container body and inverting it on the container body. One working advantage of the drinks container is the ease with which the container can be interchanged between the two configurations. The action is simple and requires minimal effort.

Yet another working advantage is the elegance of the mechanical design which is minimalist while being very effective. Finally, the drinks container is also very stylish and 'cool' while also being very practical and easy to use. Applicant therefore believes that it will find wide appeal with consumers.

A further advantage of the illustrated drinks container is that the primary and secondary outlets have a normally closed position when the adapter is in the first and second configurations respectively. Each of the primary and secondary outlets can be manually opened in the first upright and second inverted configurations respectively, to enable a user to drink liquid from the drinks container.

In the first configuration, the closure is simply removed from the primary opening. In the second inverted configuration used for sipping a drink. The secondary opening is selectively opened by a user, by simply by turning (or rotating) the adapter relative to the body to lift the adapter off the shoulder forming a gap between the adapter and the shoulder. This simple manual rotation to open and close the secondary opening to deliver a drink to the rim of the drinks container is very useful.

Another advantage of the illustrated drinks container is that the same screw threads, on respectively the container body and the adapter, can be used to hold the adapter mounted on the container body in both the first and second inverted configurations. This use of the same formations enables the construction of the drinks container to be simplified.

Yet further working advantage is that the illustrated feature of providing a second container part circumferentially mounted over the first container part is extremely useful because it enables the drinks container to provide two drinking cups from the single drinks container.

A further advantage of the drinks container described above with reference to the drawings is that the various components including the adapter and container body can be moulded using established moulding techniques and the cost of making the drinks container is not high.

It is intended that all matter contained in the above description or shown in the accompanying drawings shall be interpreted as illustrative only and not limiting. All such modifications and variations thereto, as would be apparent to persons skilled in the art, are deemed to fall within the broad scope and ambit of the invention as is set forth herein.

Changes in detail or structure may be made without departing from the basic elements of the invention as defined in the following claims.

The invention claimed is:

1. A drinks container comprising:
a container body having a base and a side wall terminating in a rim and defining an open top; and
an adapter mounted on the container body and extending across the top, which is interchangeable between
a first upright configuration where it forms a substantially central primary outlet which can be opened by a user to drink from the primary outlet, and
a second inverted configuration in which the adapter forms a secondary outlet adjacent to the side wall of the container body through which liquid can flow to the rim of the container body from where it can be drunk,
wherein the adapter is interchanged between the first and second configurations by removing it from the container body, inverting it, and mounting it back on the container body.

2. The drinks container according to claim 1, wherein the container body includes a shoulder on the side wall, and the adapter is able to bear up against the shoulder in each of the first upright and second inverted configurations to seal the adapter to the container body.

3. The drinks container according to claim 2, wherein the adapter is displaced away from the shoulder to open the secondary outlet to permit liquid to flow out through the secondary outlet.

4. The drinks container according to claim 3, wherein the adapter is mounted on the container body by complementary engagement formations on each of the adapter and the side wall of the container body, and the complementary engagement formations are configured to enable the adapter to be displaced away from the shoulder to form the secondary outlet between the shoulder and the adapter.

5. The drinks container according to claim 4, wherein the complementary engagement formations are configured such that the same engagement formations are used to mount the adapter on the container body in both the upright and inverted configurations.

6. The drinks container according to claim 4, wherein the complementary engagement formations are configured such that rotation of the adapter on the container body axially displaces the adapter away from the shoulder.

7. The drinks container according to claim 4, wherein the engagement formation on the container body forms at least one outward projecting rib and the complementary engagement formation on the adapter forms a channel within which the outward projecting rib is received and along which the rib can be slidably displaced.

8. The drinks container according to claim 4, wherein the complementary engagement formations on the container body and the adapter are rotatable into a liquid passage position where they define a flow passage though said complementary engagement formations for enabling liquid to flow from the secondary outlet to the rim of the container.

9. The drinks container according to claim 8, wherein the complementary engagement formations on each of the container body and the adapter extend around part of their circumferences, leaving another part of the circumferences of the container body and adapter respectively free of said engagement formations, and wherein said other parts of the circumferences are aligned with each other in the liquid passage position.

10. The drinks container according to claim 8, including a liquid passage indicator for indicating when the complementary engagement formations have been rotated into the liquid passage position.

11. The drinks container according to claim 10, wherein the liquid passage indicator comprises check formations on the adapter and/or the container body that act to check rotation of the adapter on the container body when the complementary engagement formations have been rotated in the liquid passage position.

12. The drinks container according to claim 11, wherein the check formations comprise tabs on the side wall of the container body and an outer circumferential surface of the adapter respectively, that interfere with rotation of the adapter on the container body and thereby signal to a user when the complementary engagement formations have reached the liquid passage position.

13. The drinks container according to claim 8, including a sipping point indicator on the rim, the sipping point indicator being longitudinally aligned with the flow passage through the complementary engagement formations in the liquid passage position.

14. The drinks container according to claim 13, wherein the rim of the container is sloped so that it extends at an acute angle to a longitudinal axis of the container body forming a pinnacle that projects axially proud of a remainder of the rim, and the sipping point indicator is formed by the pinnacle.

15. The drinks container according to claim 1, including a closure releasably mounted on the primary outlet that can be selectively removed by a user to drink through the primary outlet.

16. The drinks container according to claim 1, wherein the container body has a circular cross-sectional configuration, and the adapter has a complementary circular cross-sectional configuration that is sized to be received within the container body.

17. The drinks container according to claim 16, wherein the adapter comprises a first end that is configured to be received within the container body with a clearance and a second end forming the primary outlet, and a frusto-conical section between the first and second ends that tapers inward in a direction towards the second end.

18. The drinks container according to claim 1, wherein the adapter includes a handle formation formed thereon for enabling a user to rotate the adapter on the container body in the second inverted configuration.

19. The drinks container according to claim 1, wherein the container body comprises a first container element and a second container element that is circumferentially mounted over the first container element, and the second container element is removable from the first container element to form a separate second drinks container for holding a drink.

20. The drinks container according to claim 1, wherein the adapter comprises a conical section having a wide base and a narrow apex, and the narrow apex is proximate to the central primary outlet.

* * * * *